UNITED STATES PATENT OFFICE.

RALPH H. McKEE, OF RIDGEFIELD PARK, NEW JERSEY.

PROCESS OF OBTAINING ALCOHOL FROM SULFITE LIQUORS.

1,273,392.  Specification of Letters Patent.  Patented July 23, 1918.

No Drawing.  Application filed August 27, 1917.  Serial No. 188,399.

*To all whom it may concern:*

Be it known that I, RALPH H. McKEE, a citizen of the United States, residing at Ridgefield Park, in the county of Bergen and State of New Jersey, have invented certain new and useful Improvements in Processes of Obtaining Alcohol from Sulfite Liquors, of which the following is a specification.

This invention relates to the industrial manufacture of ethyl alcohol from waste sulfite liquors and certain equivalent raw materials containing sulfur dioxid and fermentable sugars.

If yeast be added to cooled sulfite liquor, fermentation and yeast growth will set in, with formation of small amounts of alcohol: but both fermentation and growth will practically cease at the end of a few hours, and the yield of alcohol will be very low, usually not exceeding ten per cent. of the amount theoretically obtainable from the fermentable sugars present. Somewhat larger but still inadequate yields are obtainable if the bulk of the uncombined sulfurous acid is first removed by boiling the liquor, or blowing steam or air through it, or by equivalent methods. In explanation of the small yields obtainable under the foregoing conditions it has been commonly assumed that the free sulfurous acid, calcium and magnesium sulfites, and possibly also certain organic bodies of the sulfite type, act as specific yeast poisons, stopping the yeast growth and consequently the fermentation.

The present invention is based upon the discovery that the interruption of the yeast growth and the fermentation is not due to a specific poisonous effect of free sulfurous acid or sulfites, but is due to a lack of oxygen in the solution containing these bodies. I have discovered that it is possible to obtain a strong and sustained growth of yeast and excellent fermentive activity in solutions containing considerable free sulfurous acid (un-neutralized or incompletely neutralized solutions) providing a sufficient quantity of a suitable oxidizing agent such as air is provided throughout the fermentive period. I am thereby enabled to dispense with the expensive and troublesome step of neutralizing the sulfite liquor in advance of the fermentation—a step which so far as I am aware has always been regarded as essential for good fermentation.

Following is a preferred method of carrying out my invention:—

The hot liquor from the digesters is cooled, preferably by blowing air through it. This treatment removes a portion of the free sulfurous acid, which is preferably sent to the "acid system" of the mill for recovery of the sulfur dioxid for use in the digesters. In this way a considerable proportion (possibly one-half) of the free sulfurous acid is removed; and if the original liquor is not too high in sulfur dioxid the cooled liquor is ready for fermentation. It is necessary however for the best results that the free sulfur dioxid should be reduced below a certain maximum concentration, and in case of liquors highly charged with sulfud dioxid this may be accomplished by longer blowing with air or steam, by boiling the liquor before blowing, by maintaining a higher temperature during the blowing, or by equivalent methods. I prefer that the content of free sulfur dioxid in the liquid flowing to the fermentation vats should not exceed 0.35 grams of $SO_2$ per liter of solution. It should be understood, however, that this is not an absolute maximum permissible percentage, inasmuch as there is under the present system a continuous slow loss of free sulfurous acid, or sulfur dioxid, throughout the fermentive period, so that the optimum conditions for fermentation are eventually obtained even in case the initial percentages of sulfur dioxid are materially higher than the above.

The liquor still containing some sulfur dioxid, and cooled to proper fermenting temperature, say about 27–28° C., is now transferred to the fermentation tubs (preferably covered tanks), stirred therein by a very moderate current of air, and the yeast added. The air current through the liquor is preferably maintained throughout practically the whole of the fermentative period (usually fifty to sixty hours) after which the liquor is distilled, preferably in a still of the continuous type. In order to free the resulting alcohol from any dissolved sulfur dioxid it is preferred to treat it in the latter part of the distillation with a suitable alkaline reagent, for example caustic soda, soda-ash or the like.

During the fermentation some alcohol will be carried off by the air current. Inasmuch as the fermentation vats are closed this may be recovered by bubbling the escaping gases through water, or preferably through sulfite liquor in process of preparation for the fermentive step but not yet fermenting freely and therefore containing little or no alcohol. In this way practically the whole of the alcohol is eventually recovered in the regular operation of the process.

I am aware that in certain processes having for their object the manufacture of yeast (so-called compressed yeast) rather than alcohol, it is customary to blow large volumes of air through the fermenting liquors in order to stimulate yeast growth. Under such treatment the yeast growth is exceedingly vigorous, but the production of alcohol is greatly reduced as compared with fermentation without air injection. It has also been recognized in the art of fermenting waste sulfite liquors that a preliminary aeration of the neutralized liquor is desirable, and it has even been proposed to aerate neutralized liquors containing a catalyst for oxidation in the fermenting vats while the fermenting process is going on. But so far as I am aware it has not before been recognized that an active fermentation could be carried on in presence of appreciable quantities of free sulfurous acid, that is to say, in an un-neutralized or incompletely neutralized liquor, by providing throughout the fermentive period an adequate supply of oxygen for the yeast.

The present process is applicable not only to waste sulfite liquors containing some free sulfurous acid but also to the fermentable syrups or liquors resulting from the known processes of producing fermentable sugars from cellulose or ligno-cellulose by the action of sulfur dioxid (Classen process, etc.) or acid digestive agents containing or yielding sulfur dioxid. The expression "sulfite liquors" is accordingly used herein to include products obtained by such digestive methods.

I claim:—

1. In a process of making ethyl alcohol by fermenting sulfite liquors, the steps which consist in adding yeast to sulfite liquor containing an appreciable amount of free sulfurous acid, and supplying sufficient oxygen during the fermentive process to maintain active fermentation.

2. In a process of making ethyl alcohol by fermenting sulfite liquors, the steps which consist in adding yeast to sulfite liquor containing an appreciable amount of free sulfurous acid, and aerating the solution substantially throughout the fermentation, thereby maintaining the fermentive action.

3. In a process of making ethyl alcohol by fermenting sulfite liquors, the steps which consist in adding yeast to sulfite liquor containing an appreciable amount of free sulfurous acid, aerating the solution substantially throughout the fermentation, thereby maintaining the fermentive action, and recovering alcohol vapors from the exit gases by scrubbing the same with unfermented liquor.

In testimony whereof, I affix my signature.

RALPH H. McKEE.